W. H. FIELD, Jr.
MEASURING INSTRUMENT.
APPLICATION FILED MAR. 30, 1918.
1,342,992.
Patented June 8, 1920.
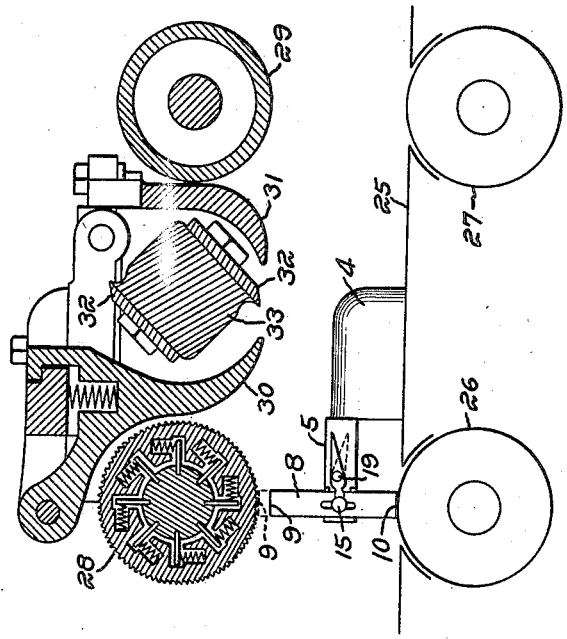
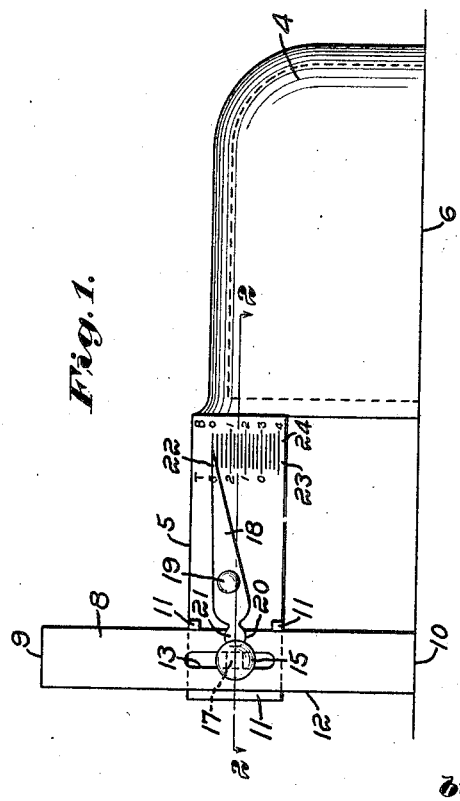
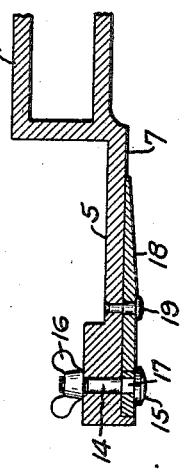
Inventor:
William H. Field Jr.
by Emery, Booth, Janney & Varney.
Attys.

UNITED STATES PATENT OFFICE.

WILLIAM H. FIELD, JR., OF WINCHESTER, MASSACHUSETTS.

MEASURING INSTRUMENT.

1,342,992.  Specification of Letters Patent.  Patented June 8, 1920.

Application filed March 30, 1918. Serial No. 225,676.

*To all whom it may concern:*

Be it known that I, WILLIAM H. FIELD, Jr., a citizen of the United States, and a resident of Winchester, in the county of Middlesex and State of Massachusetts, have invented an Improvement in Measuring Instruments, of which the following description, in connection with the accompanying drawings, is a specification, like characters on the drawings representing like parts.

This invention relates to measuring instruments, and is more especially concerned with a gage having special application to the setting of feed rolls, knives, heads, chip-breakers, pressure bars, or hold-downs of wood-planing machines, although it is by no means limited to planing machines, but may be used in connection with sanders, molders, and, in fact, all feed-roll machines.

My invention will be best understood by reference to the following description, when taken in connection with the accompanying drawings of one illustrative embodiment thereof, while its scope will be more particularly pointed out in the appended claims.

In the drawings,

Figure 1 is an elevation of a measuring instrument, or gage, embodying my invention;

Fig. 2 is a sectional view on line 2—2 of Fig. 1; and

Fig. 3 is a longitudinal, sectional view of a portion of a wood-planing machine, illustrating the mode of use of the measuring instrument or gage.

Referring to the drawings, and to the embodiment of my invention which is illustrated therein, I have shown a measuring instrument having a gage support, which may be of any suitable character, the same herein comprising a base 4 and a laterally projecting arm 5.

The base 4 may be suitably formed to rest on a flat surface, such for example as a platen, with reference to which the measuring or gaging is to be done, and to this end, in the present example, said base is provided with a flat surface 6, shown in Fig. 1. The dimensions of the base, its weight, and the location of its center of gravity, should be such as to cause the surface 6 to be seated firmly upon the platen, and to sustain the gaging devices hereinafter described supported on the arm 5. In the present example, the base is chambered to avoid unnecessary weight, while still having ample proportions to give it stability.

Preferably, the gage-supporting arm 5 is disposed adjacent one of the lateral faces of the base 4, and in the present example is laterally offset, as illustrated in Fig. 2, whereby the instrument may be brought close to laterally-disposed objects, such as the side frames or uprights of a planing machine, without interference of the base therewith. This offset relationship is of further advantage in that it permits the outer face 7 of the arm 5 to be finished or machined very conveniently, without the necessity of machining the adjacent lateral face of the base 4, as will be evident from an inspection of Fig. 2.

In connection with the setting of feed rolls, knives, heads, chip-breakers and pressure bars of planing machines, there has long been a need for an instrument for facilitating accurate setting of these parts. Heretofore, it has been the custom to make these adjustments more or less by guess work and trial, but with loss of time and more or less unsatisfactory results. As a means for enabling the parts to be adjusted quickly and accurately as to parallelism and height, and to enable both upper and lower feed rolls to be gaged, I have herein provided a gage 8 in the form of a bar mounted on the arm 5 for adjustment in a direction transverse to the surface 6, and preferably perpendicular thereto. Preferably, also, the gage or bar has a length in the direction of its adjustment greater than the greatest dimension of its support in such direction. In other words, the gage is provided with upper and lower gaging surfaces 9 and 10, preferably spaced at a distance greater than the combined height of the base 4 and arm 5.

As a means for guiding the gage in a direction perpendicular to the face 6 of the base 4, I have herein provided the arm 5 with suitable guides 11, perpendicular to such surface, and arranged to guide adjacent perpendicular edges 12 of the gage. In order to hold the gage attached to its supporting arm, and to secure the gage thereto in the desired position of vertical adjustment, I have herein provided said gage with a vertical slot 13 to receive a clamping bolt 14, the latter having a head 15 and a nut 16, which may be and herein is of the type known as a wing-nut. As a means to prevent the bolt from turning when the nut is rotated, I have herein provided said bolt with a square or flattened portion 17, having a snug working fit in the slot 13, as best shown in Fig. 1. Thus it is evident that, by loosening the wing-nut 16 very slightly, the gage 8 may be released and moved to the desired extent, limited only by the length of the slot 13, which may, of course, be any suitable length, and when the desired point is reached, the gage may be firmly clamped.

In making the adjustments to which I have referred, it is frequently desirable to have a difference in adjustment between the two parts of as little as $\frac{1}{64}$ of an inch. On the other hand, it is desirable to provide an easily read indicator scale, especially as there is apt to be a weak light at the points where the measurements are being taken. I have, therefore, provided an indicator which multiplies the travel of the gage 8, and furnishes readings in 64ths of an inch, or other suitable unit of measure, on a scale the graduations of which are actually much larger than the units which they represent. To this end, I may provide a multiplying indicator comprising a lever 18, fulcrumed on a suitable pivot 19 on the arm 5. One end of the lever is herein suitably connected to the gage 8, as by providing the latter with an opening 20 receiving an appropriately-shaped projection or tooth 21 on the lever. The other end of the lever is herein provided with a suitable pointer 22, arranged to coöperate with one or more scales. The lengths of the two arms of the lever may be suitably proportioned to give the desired multiplication.

For use in connection with taking measurements by means of the upper end 9 of the gage 8, I have herein provided a suitable graduated scale 23, which in practice may be, and is herein marked "T", meaning top, while, on the other hand, for use in connection with the lower end 10 of the gage, I have provided a second graduated scale 24, with which is associated the letter "B", meaning bottom. Preferably, the arrangement is such that, when the lower end 10 of the gage lies in the same plane as the face 6 of the base 4, the pointer 22 registers with a graduation marked 0 on the B scale. The latter may have suitable numerals, herein 1, 2, 3 and 4, representing 16ths of an inch. When the gage 8 is released and lifted, the pointer 22 moves down the B scale, and when it arrives at the desired graduation, said gage may be clamped in such position. When this is done, the lower end 10 of the scale will be located at a distance above the platen corresponding to the reading shown on the B scale. On the other hand, the T scale has a 0 graduation, which is preferably located at such a point that when the pointer 22 is in line with such graduation, the lower end 10 of the gage will be at some distance above the platen. This is of great convenience where measurements are to be taken of upper feed-rolls directly above lower feed-rolls, whose peripheries project above the plane of the platen, as it provides for a clearance between the lower end of the gage and the uppermost point of the lower feed-roll, as will be evident from an inspection of Fig. 3. The "T" scale is, of course, suitably graduated in a manner similar to the B scale, but with readings in the opposite direction.

Referring now to Fig. 3, I have there shown in longitudinal section a portion of a wood-planing machine, having a platen 25, a lower in-feed roll 26, and lower out-feed roll 27, an upper in-feed roll 28, an upper out-feed roll 29, a chip-breaker 30, pressure bar 31, knives 32, and rotating knife-head 33, all of common form familiar to those skilled in the art of wood-planing.

For nice planing, the lower feed-rolls 26 and 27 are usually raised about $\frac{1}{64}$ of an inch above the platen 25, whereas for wet, fuzzy spruce, said rolls must sometimes be raised $\frac{1}{8}$ of an inch or more. Different woods of varying thicknesses require adjustment intermediate these two extremes, in order that the best surfaces may be secured, and with the least amount of power consumed in the operation of the machine, owing to the friction of the wood on that part of the platen which is intermediate the two lower feed rolls. It is essential that both ends of each roll, whether upper or lower, should be the same height,—that is, the roll should be level to give the best results. The upper in-feed roll should be low enough to feed the stock properly, yet not too low to prevent its entrance. The chip-breaker should be level, and a little lower than the upper in-feed roll. The cutter head knives ought to be parallel with the platen, and should be adjusted in and out on a head, depending on the particular class of planing which is being done. The pressure bar must be parallel with the platen, and about $\frac{1}{64}$ of an inch below the cutting plane of the knives. The upper out-feed roll should be parallel with the platen, or in other words parallel with the bottom out-feed roll, and for general work ought to be placed about $\frac{1}{64}$ of an inch lower than the pressure bar, in order that the stock may be fed out of the planer positively.

When the instrument is in use for the setting of these various parts of the machine, the adjustments may be made most conveniently in the following order:

First: The platen is lowered an amount greater than the height of the instrument.

Second: Assuming that it is desired to plane wet spruce, the pointer of the instrument is lowered to the 8th graduation below 0 on the B scale,—that is to say, to the graduation marked 2, thus raising the gage bar $\frac{8}{64}$ of an inch, or $\frac{1}{8}$ of an inch.

Third: The base 4 is placed on the platen at the extreme end of one of the lower feed rolls, and the latter is raised or lowered, as may be necessary, in order to bring it into contact with the lower end of the gage bar. The other end of the roll is then gaged in the same manner, by placing the gage at the remaining end, and repeating the adjustment. The other lower feed roll is set in a similar manner, the gage, however, being now turned end for end, as compared with its position for the first.

Fourth: The gage bar is set at some suitable height, preferably corresponding to the 0 mark of the T scale, so that the gage bar will clear the lower in-feed roll, and the upper end of the gage bar is then used to level the upper feed-roll, as well as the chip-breaker.

Fifth: To set the knives, the gage is placed on the platen at the extreme right or left, and the bed of the machine is then raised to bring the top of the gage bar in contact with the knife edge when in its lowermost position. The amount of projection of the knife edge can be regulated by a slight raising or lowering of the bed. When the proper adjustment is determined, that end of the knife can be fastened and the cylinder revolved until the next knife is brought into the same position, when the latter can be set in the same manner, and so on, depending upon the number of knives on the cutter head. The gage is then turned end for end, moved to the other extreme end of the platen, but with the bed at the same height as before, whereupon the corresponding ends of the cutters are set in a similar manner, with the same setting of the gage.

Sixth: To set the pressure bar, the pointer should be raised one graduation from 0 of the T scale, thus lowering the gage bar $\frac{1}{64}$ of an inch. Then the gage is placed on the platen at one extreme end of the pressure bar, and the latter is adjusted at such end, after which the gage is moved to the other extreme end and a similar adjustment is made.

Seventh: To set the upper out-feed roll in proper relation to the cutter head and pressure bar, the pointer should be raised one more graduation on the T scale, thus lowering the gage bar an additional $\frac{1}{64}$ of an inch, whereupon the operator may proceed to set such roll in an obvious manner.

Thus it is evident that I have provided an instrument which enables planing and other similar machines to be set accurately and expeditiously, thus avoiding the inaccuracies and losses of time which have heretofore characterized the use of machines of this class.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. In an instrument for taking measurements in a direction transverse to the face of a platen, the combination of a base having a flat face to rest upon the face of said platen, an arm projecting laterally from and beyond said base at a substantial distance from the face thereof, a gage mounted on said arm for adjustment in a direction transverse to said faces and having a length in the direction of its adjustment greater than the greatest dimension of said base and arm in such direction, and an indicator operated by said gage and mounted on said arm.

2. In an instrument for taking measurements in a direction transverse to the face of a platen, the combination of a base having a face to rest upon the face of said platen, an arm projecting laterally from and beyond said base at a substantial distance from the face thereof, a gage mounted on said arm for adjustment in a direction transverse to said faces and having a length in the direction of its adjustment greater than the greatest dimension of said base and arm in such direction, and an indicator operated by said gage comprising a lever disposed substantially lengthwise of said arm.

3. In an instrument for taking measurements in a direction substantially perpendicular to the face of a platen, the combination of a support comprising a base having a surface to rest on the face of said platen, and an arm projecting laterally from said base; said arm being provided with a guide substantially perpendicular to said surface;

an adjustable gage guided by said guide in a direction substantially perpendicular to said surface, said gage being provided with a slot extending in said direction; a clamping bolt extending through said arm and through said slot to secure said gage in the desired position of adjustment; and indicating means including a scale and a lever fulcrumed on said arm, one end of said lever being connected to and operated by said gage and the other end constituting a pointer coöperating with said scale.

In testimony whereof I have signed my name to this specification.

WILLIAM H. FIELD, Jr.